(12) United States Patent
Folgado et al.

(10) Patent No.: US 8,529,153 B2
(45) Date of Patent: Sep. 10, 2013

(54) ELEMENT USED TO FORM BREAKWATERS

(75) Inventors: Josep Ramon Medina Folgado, Valencia (ES); Maria Esther Gomez Martin, Valencia (ES)

(73) Assignee: Universidad Politecnica de Valencia, Valencia (ES)

( * ) Notice: Subject to any disclaimer, the term of this patent is extended or adjusted under 35 U.S.C. 154(b) by 654 days.

(21) Appl. No.: 11/995,371

(22) PCT Filed: Jul. 11, 2006

(86) PCT No.: PCT/ES2006/000395
§ 371 (c)(1),
(2), (4) Date: Jun. 18, 2008

(87) PCT Pub. No.: WO2007/006831
PCT Pub. Date: Jan. 18, 2007

(65) Prior Publication Data
US 2008/0286045 A1     Nov. 20, 2008

(30) Foreign Application Priority Data

Jul. 11, 2005  (ES) .................................... 200501750

(51) Int. Cl.
*E02B 3/14*       (2006.01)
(52) U.S. Cl.
USPC ............... 405/16; 405/25; 405/302.4; 428/15
(58) Field of Classification Search
USPC .................. 405/15, 16, 21, 24, 25, 29, 258.1, 405/302.4, 302.6; 428/15, 402; D21/484, D21/499, 504, 505; D25/113
See application file for complete search history.

(56) References Cited

U.S. PATENT DOCUMENTS

| | | | | |
|---|---|---|---|---|
| 3,374,917 A | * | 3/1968 | Troy ............................ | D25/113 |
| 3,461,574 A | * | 8/1969 | Larsen et al. ................. | 434/403 |
| D224,425 S | * | 7/1972 | Stahel, II ..................... | D21/499 |
| 3,822,499 A | * | 7/1974 | De Vos ......................... | 446/121 |
| 4,347,017 A | * | 8/1982 | Chevallier ..................... | 405/29 |
| 4,411,555 A | * | 10/1983 | Minvielle et al. ............... | 405/50 |
| D283,635 S | * | 4/1986 | Kato et al. .................. | D21/499 |
| 4,594,023 A | * | 6/1986 | O'Neill ........................ | 405/29 |
| D296,342 S | * | 6/1988 | Knudsen ...................... | D21/499 |
| 5,190,403 A | * | 3/1993 | Atkinson ...................... | 405/29 |
| D358,858 S | * | 5/1995 | McGreevy ................... | D21/707 |
| D359,315 S | * | 6/1995 | Tacey .......................... | D21/499 |
| 5,556,230 A | * | 9/1996 | Turk et al. ...................... | 405/29 |

(Continued)

FOREIGN PATENT DOCUMENTS

| ES | 488536 | 10/1980 |
|---|---|---|
| ES | 282009 | 4/1985 |

(Continued)

OTHER PUBLICATIONS

International Search Report issued Jan. 11, 2007.

*Primary Examiner* — Tara M. Pinnock
(74) *Attorney, Agent, or Firm* — Wenderoth, Lind & Ponack, L.L.P.

(57) ABSTRACT

The invention relates to an armor unit to construct armor layers of mound breakwaters, revetments and groins for shore protection or hydraulic and maritime structures featuring a cubic or parallelepiped shape (2) and having one or more protrusions (1) on its faces to prevent coupling between the different armor units and to increase interlocking with the underlayer (3) of the armor layer.

30 Claims, 9 Drawing Sheets

(56) References Cited

U.S. PATENT DOCUMENTS

| | | | |
|---|---|---|---|
| D377,396 S * | 1/1997 | Maurel | D25/113 |
| 5,620,280 A * | 4/1997 | Melby et al. | 405/29 |
| 5,921,710 A * | 7/1999 | Scales | 405/20 |
| D437,366 S * | 2/2001 | Stemmler | D21/499 |
| 6,443,654 B1 * | 9/2002 | Kauppi | 405/108 |
| 6,508,042 B1 * | 1/2003 | Kweon et al. | 52/608 |
| 6,666,620 B2 * | 12/2003 | Yang | 405/29 |
| 6,921,314 B2 * | 7/2005 | Miller | 446/85 |
| 7,160,057 B2 * | 1/2007 | Reedijk et al. | 405/25 |
| 2002/0114669 A1 * | 8/2002 | Yang | 405/29 |
| 2004/0018055 A1 | 1/2004 | Clark et al. | |

FOREIGN PATENT DOCUMENTS

| | | |
|---|---|---|
| ES | 2 043 559 | 12/1993 |
| FR | 2 863 632 | 6/2005 |
| JP | 57-184109 | 11/1982 |
| NL | 7116401 | 6/1973 |
| WO | 2004/009910 | 1/2004 |
| WO | WO 2008115617 A2 * | 9/2008 |

* cited by examiner

ELEMENT USED TO FORM BREAKWATERS

OBJECT OF THE INVENTION

The present invention relates to an armor unit to construct armor layers of mound breakwaters, coastal revetments and groins for shore protection in maritime and hydraulic structures.

Specifically, the object of the invention is an armor unit to protect against large waves which has a basic cubic or parallelepiped shape characterized by one or more protrusions on its faces to prevent coupling between units and to increase interlocking with the underlayer of quarrystone.

BACKGROUND OF THE INVENTION

The manufacture of artificial quarrystone for the construction of mound breakwaters and shore protection structures is a well-known problem. Until now, different solutions have been applied unsuccessfully, through the design of numerous armor units, generally made of concrete, to construct armor layers of mound breakwaters for protection against wind wave attack.

It is worth highlighting that said concrete units for breakwater armor layers are not to be confused with those used for the construction of artificial reefs, since said armor units are designed to resist against large wave breaking and are characterized by specific features such as stability and strength while the artificial reefs are used to improve or protect marine habitats and almost any unit made of any material denser than water is considered suitable.

Concrete armor units for mound breakwaters may be classified according to the design, the construction process and the resistant performance against the wave storms. There are three main methods to place armor units in the construction of an armor layer: (a) random placement, (b) placed in a single layer and (c) regular uniform placement.

The armor units with random placement (a) are the conventional armor units for substituting quarrystone, which are placed in more than one single layer and basically resist by gravity. Both simple and complex armor units can be found within the group of random placement units.

Cubic and parallelepiped blocks are simple armor units, robust, solid, easy to construct and flexible in their performance against the wave storms. Further, they do not undergo significant unit breaking fractures nor do they lose stability, and any errors in design usually increase armor erosion but rarely lead to the complete destruction of the breakwater. However, these are units which have serious drawbacks as regards face-to-face fitting, which can result in significant permeability changes when the packing density increases in the lower areas causing a displacement of armor units from the upper areas (heterogeneous packing). Face-to-face fitting can also result in a reduction in friction with the underlayer and other problems derived from a certain self-arrangement of the armor units which should be placed and maintained in a random position.

The group of complex armor units with random placement includes the so-called "Tetrapod" armor units, which have a higher stability coefficient as a result of their resistance due to interlocking. Nevertheless, the ease with which these units break if they are too large is considered a major drawback. They are brittle and are not resistant to large unit movements; therefore, any error in the design wave storm may lead to the unexpected complete destruction of the breakwater in the first intense storm after construction.

The group of armor units with non-random placement (b) in a single layer includes the so-called "Accropode" and "Core-Loc" armor units which have a good interlocking between units, but have a relatively brittle structural performance because when any of the units fail, a progressive failure takes place. These armor units require less concrete but they must be placed with great care. Any error in the construction or calculation of the design wave storm can lead to the total destruction of the structure.

Finally, the armor units with regular uniform placement (c) may be either simple in shape like the so-called "Seabee" or "Hollow" shapes or more complex in shape such as the "Cob" or "Shed" ones. These units are usually placed in a single, uniform layer and their resistance depends fundamentally on gravity, friction and interlocking between the armor units, forming an assembly. As in the previous case, these armor units are also quite resistant at the start of damage due to the tight interlocking between armor units, but they have a very brittle structural performance because they tend to present a progressive failure to destruction if any of the armor units fail.

Focusing on the armor units with random placement, and more specifically on the mentioned cubic and parallelepiped blocks which, as stated earlier, are robust and easy to manufacture and are used along many coasts such as those of Spain, these units have serious drawbacks due to face-to-face fitting or self-arrangement. The reason is the parallelepiped design tends to pack armor units in the lower areas with small movements, forming armor layers with many planar faces coupled in the critical areas at sea level, decreasing the water friction on the slope of the mound and thus allowing a higher run-up and overtopping and even the flooding of the rear side of the breakwater if the wave is very large.

DESCRIPTION OF THE INVENTION

The armor unit described in the present invention, being of the cubic and parallelepiped type usually manufactured for random placement, effectively solves the aforementioned drawbacks, and is considered an excellent solution for problems related to the self-arrangement and the decrease in friction.

Specifically, the improvement is achieved by means of cubic or parallelepiped armor units which feature protrusions to prevent coupling between the faces of the armor units and to diminish their tendency to self-arrangement while, at the same time, increasing the friction with the underlayer, which implies a reduction in run-up and overtopping rates.

Said protrusions, which can be located centered in both a length direction and a height direction on the face of the unit, can also have different shapes, such as a frustoconical or truncated pyramidal shape. These different shapes of said protrusions provide the unit greater friction with the underlayer, made of natural or artificial quarrystone, because said protrusions tend to penetrate into the underlayer, generating a passive resistance which clearly improves the tendency of the cubic or parallelepiped blocks to place the faces parallel to the underlayer with an increased degree of friction between layers.

In addition to the increased interlocking with the underlayer, the said protrusions of the armor unit prevent the face-to-face fitting caused by the movements of the armor units during the structure's lifetime, which leads to self-arrangement and reduces the porosity of the lower areas of the armor layer. Preventing the face-to-face fitting in the lower areas of the armor layer and the corresponding porosity reduction, the downward armor unit displacement is reduced as well as the displacement of armor units from the upper area, near the water level, which has an effect similar to erosion due to armor unit extraction. The reduction or suppression of the heterogeneous packing problem in the armor layer maintains the high hydraulic resistance capacity of the armor layer to armor unit extraction caused by wave attack.

Finally, another advantage of the invention is related to the possible fracture or erosion of the protrusions over time which results in a conventional cubic or parallelepiped unit; therefore, at the very least the invention will have the stability and robustness features of those conventional armor units.

DESCRIPTION OF THE DRAWINGS

To complement the description herein and to enhance the understanding the features of the invention according to a preferred practical embodiment thereof, a set of drawings is attached as an integral part of said description, in which the following is shown with an illustrative and non-limiting character.

DESCRIPTION OF THE PREFERRED EMBODIMENT OF THE INVENTION

In view of the indicated figures, one can easily note how the armor unit to construct armor layers of mound breakwaters of the present invention, based on a simple cubic or parallelepiped structure (2), has a series of protrusions (1) which are located centered in both a length direction and a height direction on its side faces.

Figure 1A:
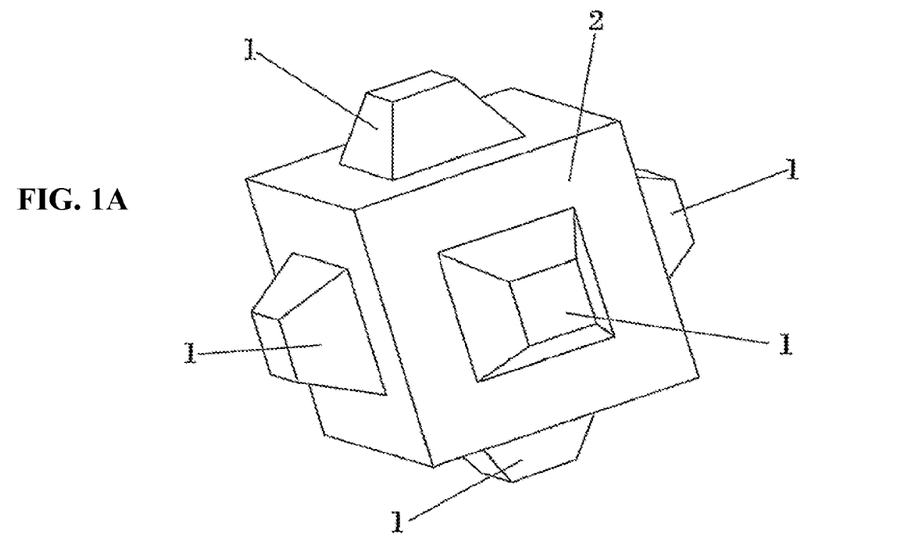
FIGS. 1A and 1B show a perspective view and a cross-section of the armor unit of the invention in a cubic embodiment, the protrusions of which are formed by truncated pyramids with a square section.
Figure 1B:
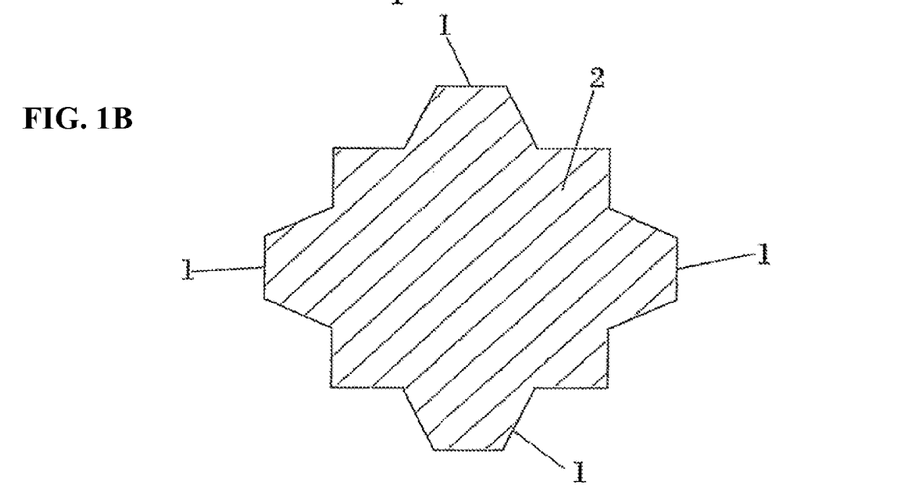
Figure 2A:
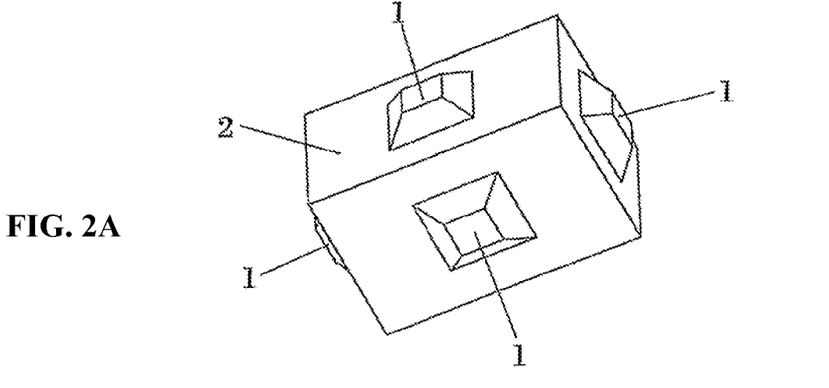
FIGS. 2A, 2B and 2C show a perspective view and two cross-sections of the armor unit of the invention, a longitudinal section and a cross-section, in a parallelepiped embodiment, the protrusions of which are formed by truncated pyramids with a square section.
Figure 2B:
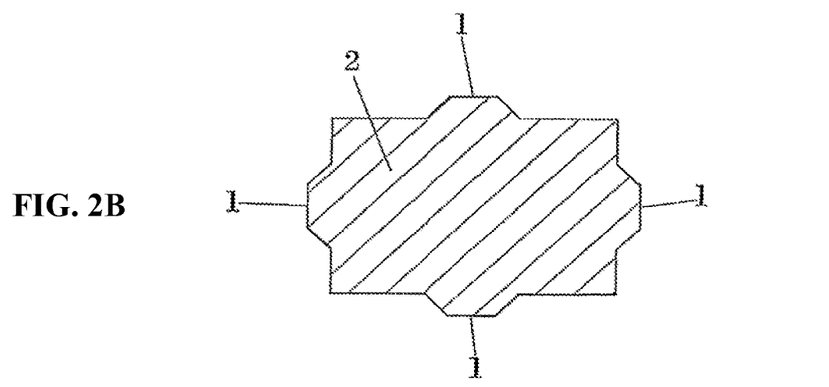
Figure 2C:
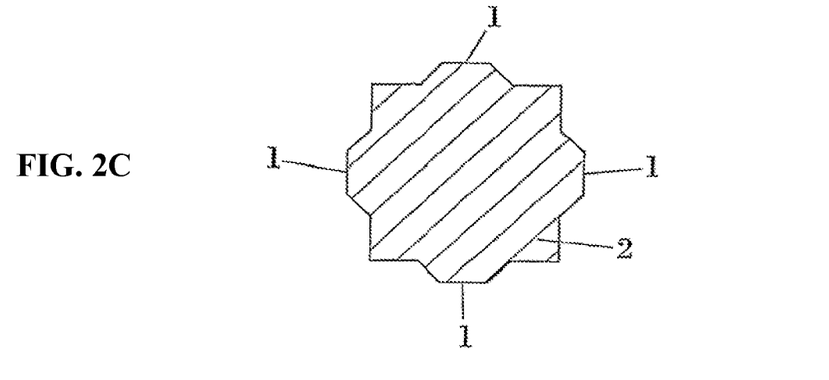
Figure 3:
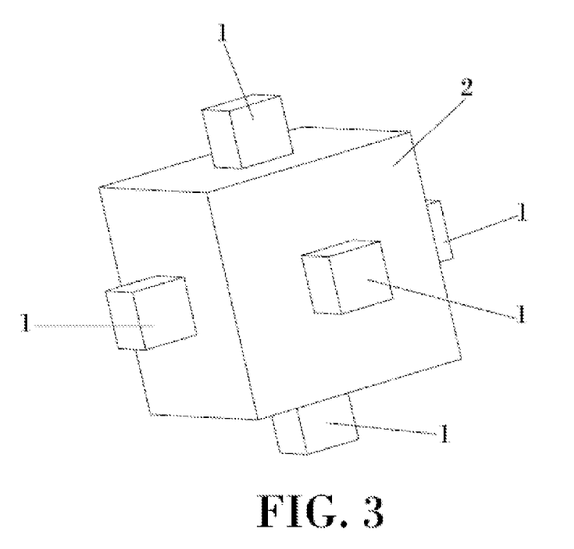
FIG. 3 shows a perspective view of the armor unit of the invention in a cubic embodiment, the protrusions of which are formed by truncated pyramids with a square section.
Figure 4:
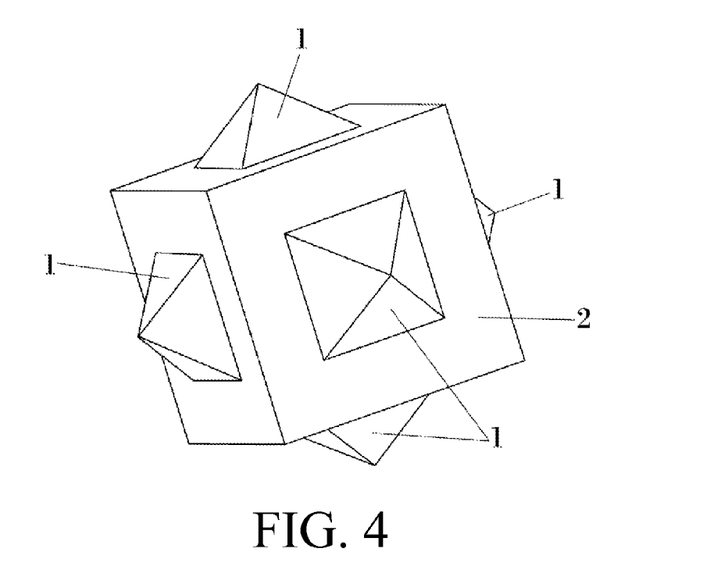
FIG. 4 shows a perspective view of the armor unit of FIGS. 1A and 1B with pyramidal protrusions with a square section.
Figure 5:
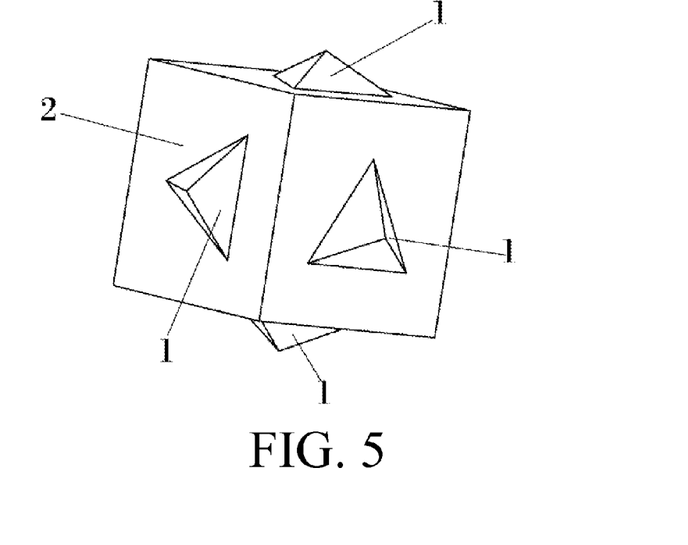
FIG. 5 shows a perspective view of the armor unit of FIGS. 1A and 1B with pyramidal protrusions with a triangular section.
Figure 6:
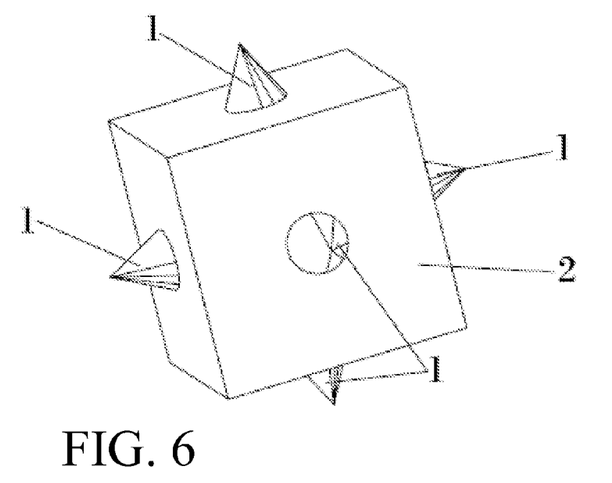
FIG. 6 shows a perspective view of the armor unit of FIGS. 1A and 1B with conical protrusions.
Figure 7:
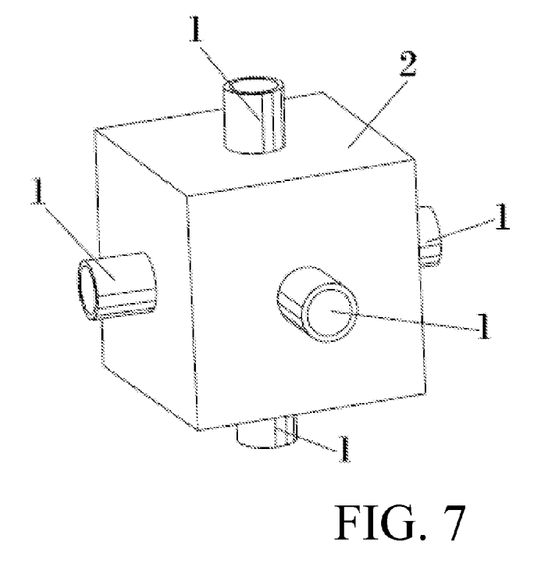
FIG. 7 shows a perspective view of the armor unit of FIGS. 1A and 1B with cylindrical protrusions.
Figure 8:
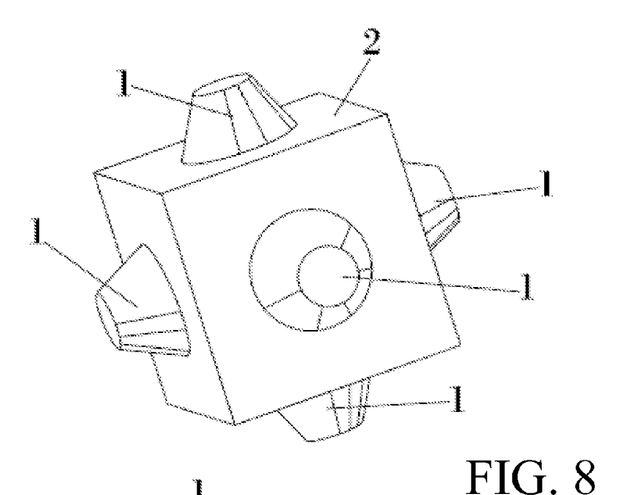
FIG. 8 shows a perspective view of the armor unit of FIGS. 1A and 1B with frusto-conical-shaped protrusions.
Figure 9:
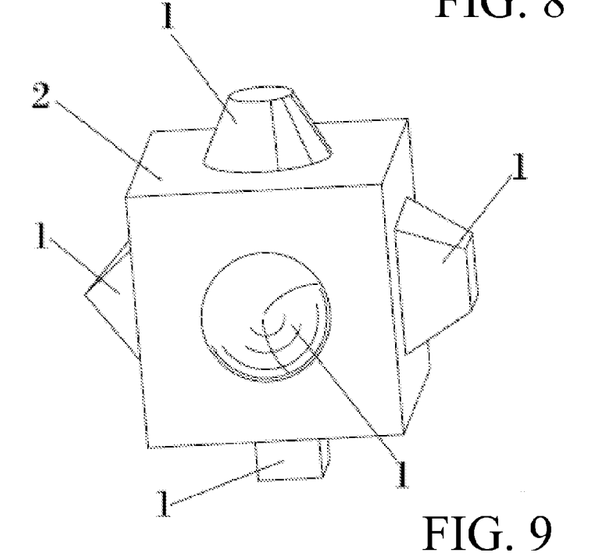
FIG. 9 shows a perspective view of the armor unit of FIGS. 1A and 1B with different types of protrusions.
Figure 10:
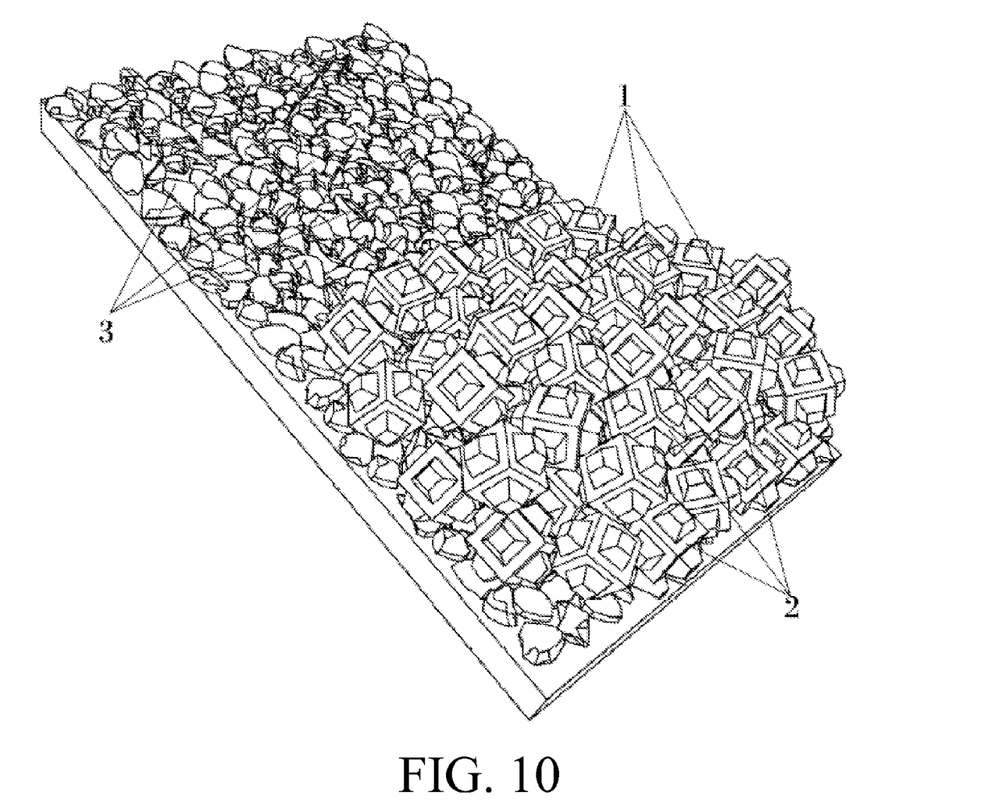
FIG. 10 shows a perspective view of a main armor area formed by cubic armor units such as those of FIGS. 1A and 1B on an underlayer of quarrystone.
Figure 11:
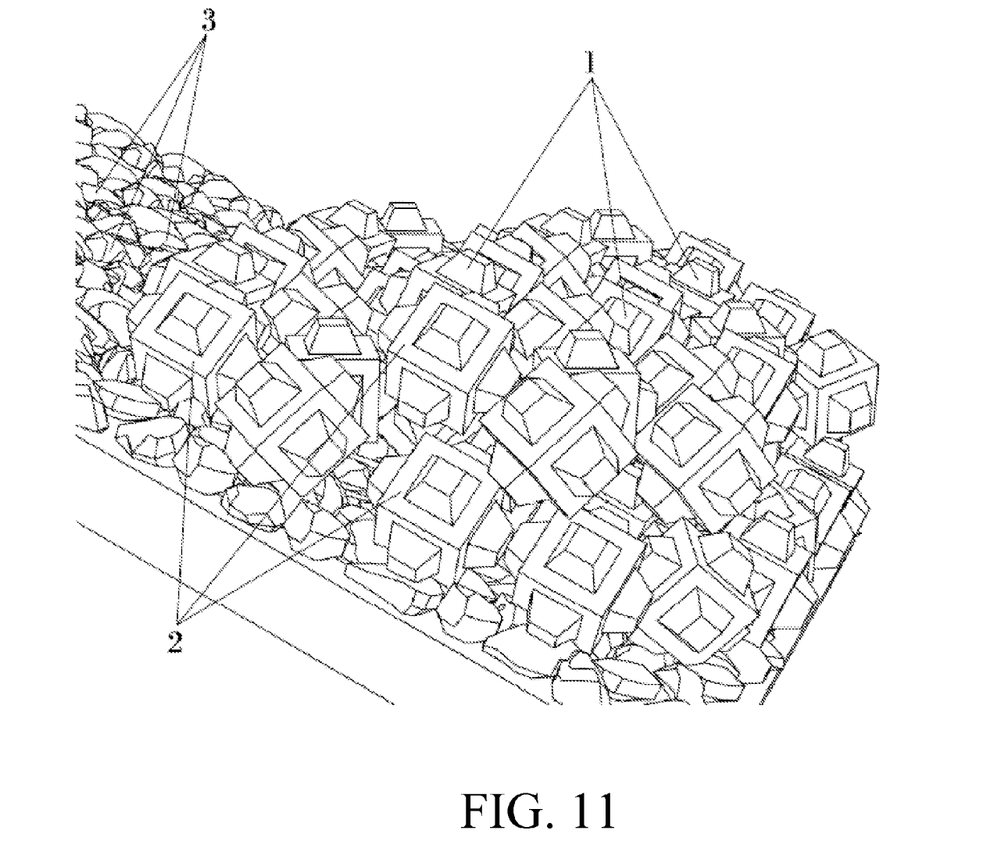
FIG. 11 shows a detail of the previous FIG. 10 in which the armor unit penetrates the underlayer.
Figure 12:
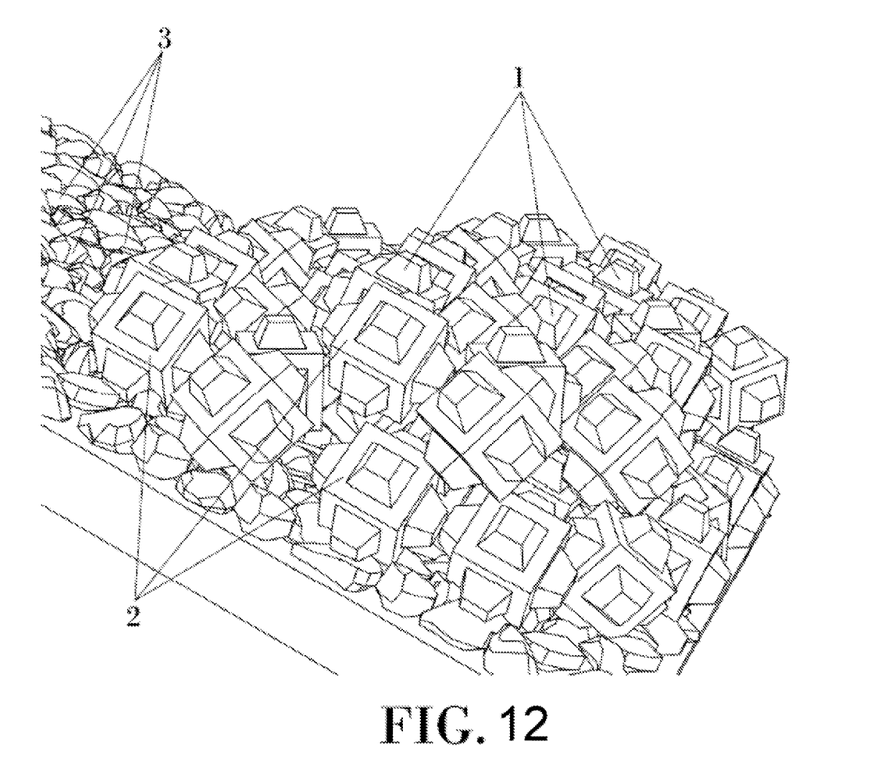
FIG. 12 shows a detail of the previous figure (11) in which the armor unit penetrates the underlayer.

Said protrusions can likewise have difference shapes such as pyramidal, conical, prismatic, cylindrical, etc., as well as any shape which aims to prevent face-to-face fitting and corresponding self-arrangement and to increase the friction with the underlayer of the armor, as seen in FIG. 11.

Furthermore, to obtain different degrees of separation between the armor units, said protrusions (1) can also adopt different shapes and sizes, as can be inferred by observing the figures. Alternative embodiment armor units are shown with combinations of different protrusions (1) on the same unit.

In a preferred embodiment, the dimensions of the protrusions (1) are small compared to those of the basic cube or parallelepiped (2) armor unit because their main purpose is to prevent their face-to-face fitting, maintaining the robustness of the conventional basic unit.

In a possible embodiment, said protrusions (1) have, for example, a volume such that the sum of the volumes of all is one order of magnitude less than the volume of the basic unit, in other words, less than 15%.

In any case, the armor unit for the construction of the armor layer of mound breakwaters of the present invention usually has a cubic or parallelepiped fundamental structural base (2), solid, with the majority of the volume made of a heavy material, such as concrete, reinforced or prestressed concrete and the like, and protrusions (1) including only a small part of the volume of the armor unit and made of a resistant material, such as concrete or steel, among others.

The invention claimed is:

1. An armor unit to construct armor layers of mound breakwaters, revetments and groins for shore protection and hydraulic and maritime structures, the armor unit being made of a material so as to resist against wave breaking, said armor unit comprising a shape selected from a solid cubic shape and a solid parallelepiped shape, and wherein said armor unit further comprises a protrusion on at least one face of the armor unit, and said protrusion being arranged so as to be centered in both a length direction and a height direction on the face, such that a combination of an armor unit weight and the arrangement of the protrusion provokes a random placement of the armor unit, prevents a coupling between faces of adjacent armor units and increases interlocking of the armor unit with an underlayer of quarrystone, during the construction process and throughout the structure's lifetime,
wherein the material is made of concrete.

2. The armor unit of claim 1, wherein the combined volume of said at least one protrusion is less than the total volume of the armor unit without said at least one protrusion.

3. The armor unit of claim 2, wherein the combined volume of said at least one protrusion is one order of magnitude lower than the volume of the armor unit without said at least one protrusion.

4. The armor unit of claim 3, wherein the combined volume of said at least one protrusion is less than 15% of the total volume of the unit without said at least one protrusion.

5. The armor unit of claim 1, wherein said at least one protrusion comprises a shape selected from a pyramidal shape and a truncated pyramidal shape.

6. The armor unit of claim 1, wherein said at least one protrusion comprises a shape selected from a conical shape and a frustoconical shape.

7. The armor unit of claim 1, wherein said at least one protrusion comprises a cylindrical shape.

8. The armor unit of claim 1, wherein said at least one protrusion comprises a spherical shape.

9. The armor unit of claim 1, wherein said at least one protrusion on the at least one face comprises protrusions with different shapes.

10. The armor unit of claim 1, wherein the concrete is selected from reinforced concrete and prestressed concrete.

11. An armor unit to construct armor layers of mound breakwaters, revetments and groins for shore protection and hydraulic and maritime structures, the armor unit being made of a material so as to resist against wave breaking, said armor unit comprising a shape selected from a solid cubic shape and a solid parallelepiped shape, and wherein said armor unit further comprises five protrusions on five faces of the armor unit, one protrusion per one of said five faces, having an arrangement of each protrusion centered in both a length direction and a height direction on a respective face, such that a combination of an armor unit weight and the arrangement of each protrusion provokes a random placement of the armor unit, prevents coupling between faces of adjacent armor units and increases interlocking of the armor unit with an underlayer of quarrystone, during the construction process and throughout the structure's lifetime, wherein the material is made of concrete.

12. The armor unit of claim 11, wherein the combined volume of said five protrusions is less than the total volume of the armor unit without said five protrusions.

13. The armor unit of claim 12, wherein the combined volume of said five protrusions is one order of magnitude lower than the volume of the armor unit without said five protrusions.

14. The armor unit of claim 13, wherein the combined volume of said five protrusions is less than 15% of the total volume of the unit without said five protrusions.

15. The armor unit of claim 11, wherein each of said five protrusions comprises a shape selected from a pyramidal shape and a truncated pyramidal shape.

16. The armor unit of claim 11, wherein each of said five protrusions comprises a shape selected from a conical shape and a frustoconical shape.

17. The armor unit of claim 11, wherein each of said five protrusions comprises a cylindrical shape.

18. The armor unit of claim 11, wherein s each of aid five protrusions comprises a spherical shape.

19. The armor unit of claim 11, wherein each of said five protrusions has a shape than is different that a shape of each other of said five protrusions.

20. The armor unit of claim 11, wherein the concrete is selected from reinforced concrete and prestressed concrete.

21. An armor unit to construct armor layers of mound breakwaters, revetments and groins for shore protection and hydraulic and maritime structures, the armor unit being made of a material so as to resist against wave breaking, said armor unit comprising a shape selected from a solid cubic shape and a solid parallelepiped shape, and wherein said armor unit further comprises six protrusions on six faces of the armor unit, one protrusion per face, having an arrangement of each protrusion centered in both a length direction and a height direction on a respective face, such that a combination of an armor unit weight and the arrangement of each protrusion provokes a random placement of the armor unit, prevents coupling between faces of adjacent armor units and increases interlocking with an underlayer of quarrystone, during the construction process and throughout the structure's lifetime, wherein the material is made of concrete.

22. The armor unit of claim 21, wherein the combined volume of said six protrusions is less than the total volume of the armor unit without said six protrusions.

23. The armor unit of claim 22, wherein the combined volume of said six protrusions is one order of magnitude lower than the volume of the armor unit without said six protrusions.

24. The armor unit of claim 23, wherein the combined volume of said six protrusions is less than 15% of the total volume of the unit without said six protrusions.

25. The armor unit of claim 21, wherein each of said six protrusions comprises a shape selected from a pyramidal shape and a truncated pyramidal shape.

26. The armor unit of claim 21, wherein each of said six protrusions comprises a shape selected from a conical shape and a frustoconical shape.

27. The armor unit of claim 21, wherein each of said six protrusions comprises a cylindrical shape.

28. The armor unit of claim 21, wherein each of said six protrusions comprises a spherical shape.

29. The armor unit of claim 21, wherein each of said six protrusions has a shape that is different than a shape of each other of said six protrusions.

30. The armor unit of claim 21, wherein the concrete is selected from reinforced concrete and prestressed concrete.

* * * * *